(12) United States Patent
Wang et al.

(10) Patent No.: US 12,384,720 B1
(45) Date of Patent: Aug. 12, 2025

(54) PREPARATION METHOD OF RUBBER POWDER-SEDIMENT-FLY ASH ARTIFICIAL FINE AGGREGATE

(71) Applicant: Inner Mongolia Agricultural University, Hohhot (CN)

(72) Inventors: Hailong Wang, Hohhot (CN); Xiaoxiao Wang, Hohhot (CN)

(73) Assignee: Inner Mongolia Agricultural University, Hohhot (CN)

( * ) Notice: Subject to any disclaimer, the term of this patent is extended or adjusted under 35 U.S.C. 154(b) by 0 days.

(21) Appl. No.: 19/023,190

(22) Filed: Jan. 15, 2025

(30) Foreign Application Priority Data

Jul. 22, 2024 (CN) .......................... 202410978177.2

(51) Int. Cl.
*C04B 18/02* (2006.01)
*C04B 18/08* (2006.01)

(52) U.S. Cl.
CPC ............ *C04B 18/027* (2013.01); *C04B 18/08* (2013.01)

(58) Field of Classification Search
CPC .............................. C04B 18/027; C04B 18/08
See application file for complete search history.

(56) References Cited

FOREIGN PATENT DOCUMENTS

| CN | 102643061 A | | 8/2012 | |
|---|---|---|---|---|
| CN | 113061043 A | * | 7/2021 | ....... C04B 35/62204 |
| CN | 114890759 A | | 8/2022 | |
| CN | 117024043 A | | 11/2023 | |
| GB | 1447350 A | | 8/1976 | |

OTHER PUBLICATIONS

JG/T568-2019, Aggregate for high performance concrete, China National Standards, 2019, pp. 1-18, Ministry of Housing and Urban-Rural Development of the People's Republic of China.

* cited by examiner

*Primary Examiner* — Anthony J Green
(74) *Attorney, Agent, or Firm* — Bayramoglu Law Offices LLC

(57) ABSTRACT

A preparation method of a rubber powder-sediment-fly ash artificial fine aggregate is provided. The rubber powder-sediment-fly ash artificial fine aggregate is prepared by a rolling and compression granulator through layer-by-layer coating of a rubber powder, a canal sediment, and a hydraulic material. The compact arrangement and aggregation are achieved for an artificial aggregate by applying a pressure to improve the compactness of the aggregate. In addition, an aggregate is cured through a multi-stage high-temperature treatment and carbon dioxide air-cooling to further improve the compactness and strength of the aggregate. When the artificial fine aggregate is used as a fine aggregate, solid wastes can be reasonably utilized under the premise of meeting quality standards, which is of great practical significance for protecting the ecological environment and promoting the sustainable development of sand and gravel industry.

7 Claims, 2 Drawing Sheets

PREPARATION METHOD OF RUBBER
POWDER-SEDIMENT-FLY ASH ARTIFICIAL
FINE AGGREGATE

CROSS REFERENCE TO THE RELATED APPLICATIONS

This application is based upon and claims priority to Chinese Patent Application No. 202410978177.2, filed on Jul. 22, 2024, the entire contents of which are incorporated herein by reference.

TECHNICAL FIELD

The present disclosure relates to the technical field of preparation of artificial fine aggregates, and specifically relates to a preparation method of a rubber powder-sediment-fly ash artificial fine aggregate.

BACKGROUND

There is a large sediment load in the Yellow River in total, and sediments are easily produced in large quantities at a low flow velocity. The general treatment method is to regularly clear and accumulate the sediments at both sides of the canal embankment. However, sediments have a small and relatively single particle size. As a result, in the dry and windy climate of the spring, a large amount of raising dust is easily produced from sediments, which imposes a large impact on the environment. Moreover, sediments cover the plate ground and two slope bottoms for canal lining and adsorb and retain the water, which will aggravate the erosion and frost-heaving damage for canal lining in the winter. Because the land in the irrigation area is mostly basic farmland in which the sand and gravel output is basically zero, the sand and gravel required for the annual canal maintenance and repair construction need to be transported from tens of kilometers away, resulting in high economic and ecological costs. Therefore, how to reasonably utilize treated sediments for canals is a problem to be considered currently. With the rapid economic development, the total demand for tires has increased significantly, but there is a low recycling rate of tires, resulting in environmental pollution. An important direction of tire recycling is the production of rubber powders. A rubber powder can be incorporated into common concrete to make the concrete have excellent impact resistance, fatigue resistance, and frost resistance. How to reasonably utilize rubber powders for the lining of canals of water conservancy engineering is currently a problem urgently to be solved. Fly ash is one of the solid wastes with the largest accumulation in China. Fly ash accumulation areas are mainly industrial and mining areas, and there are disadvantages such as large storage amounts, low utilization rates, and insufficient recycling. The mass accumulation of fly ash causes unignorable pollution to soil, water resources, the atmosphere, etc.

How to convert the above-mentioned wastes into high-quality resources through scientific and effective resource utilization technologies has gradually become the research focus of researchers in the art.

As a basic material for engineering construction, sand and gravel aggregates are consumed in large proportions. In recent years, with the large-scale mining of sand and gravel aggregates, the surface environment has changed, which affects the vegetation diversity and aggravates the loss of water and soil. Therefore, how to give full play to the substitution role of artificial aggregates developed from solid wastes is of great practical significance for protecting the ecological environment and promoting the sustainable development of the sand and gravel industry.

Based on the above analysis, it can be known that the development of a brand-new resource utilization technique to prepare an artificial aggregate with solid wastes such as rubber powder, sediment, and fly ash as raw materials is of obvious guiding significance for the rational utilization of solid wastes and the reduction of mining of natural sand and gravel aggregates.

SUMMARY

In view of the deficiencies of the prior art, an objective of the present disclosure is to provide a preparation method of a rubber powder-sediment-fly ash artificial fine aggregate. In the present disclosure, the rubber powder-sediment-fly ash artificial fine aggregate is prepared by a rolling and compression granulator through layer-by-layer coating of a rubber powder, a canal sediment, and a hydraulic material. The compact arrangement and aggregation are achieved for an artificial aggregate by applying a pressure to improve the compactness of the aggregate. In addition, an aggregate is cured through a multi-stage high-temperature treatment and carbon dioxide air-cooling to improve the compactness and strength of the aggregate. When the artificial fine aggregate is used as a fine aggregate, solid wastes can be reasonably utilized under the premise of meeting quality standards, which is of great practical significance for protecting the ecological environment and promoting the sustainable development of sand and gravel industry.

In order to achieve the above objective, the present disclosure provides the following technical solutions:

A preparation method of a rubber powder-sediment-fly ash artificial fine aggregate is provided, specifically including the following steps:

S1, adjusting an inclination angle of a rolling and compression granulator to 40° to 50°, and adjusting a pressure of a pressure plate to 0.1 MPa to 0.3 MPa;

S2, soaking a rubber powder in a saturated sodium hydroxide solution for 20 h to 24 h at room temperature to improve hydrophobicity of the rubber powder;

S3, in parts by mass, feeding 1 part to 1.5 parts of a soaked rubber powder produced in the S2 into the rolling and compression granulator through a feeding port; starting the rolling and compression granulator such that the rolling and compression granulator starts to rotate; adjusting a rotational speed of the rolling and compression granulator to 25 HZ to 28 HZ, and allowing the rolling and compression granulator to rotate for 2.5 min to 3 min, during which 10 mL to 15 mL of a fluorosilicate-graphene two-component mixed solution is evenly sprayed every other minute by a spray can in a particle movement path direction to make particles of the rubber powder bonded with each other and the rolling and compression granulator is paused every 10 s to 12 s to observe a particle size; and when 60% or more of particles have a particle size of 1.5 mm, stopping the rolling and compression granulator to produce interbonded rubber-powder particles with rough and uneven surfaces;

S4, taking the interbonded rubber-powder particles obtained in the S3 out from the rolling and compression granulator, and sieving the interbonded rubber-powder particles through a square-hole sieve to produce interbonded rubber-powder particles with a particle size of 1.5 mm to 2.3 mm as a first core;

S5, in parts by mass, oven-drying 6.9 parts to 8.1 parts of a sediment to a constant weight;

S6, feeding the first core obtained in the S4 and a dried sediment obtained in the S5 into the rolling and compression granulator through the feeding port; re-starting the rolling and compression granulator, adjusting a rotational speed of the rolling and compression granulator to 40 HZ to 45 HZ, and allowing the rolling and compression granulator to rotate for 3 min to 4 min, during which 10 mL to 15 mL of a fluorosilicate-graphene two-component mixed solution is evenly sprayed every other minute by a spray can in a particle movement path direction and a particle size is observed every 10 s to 12 s; and when 60% or more of particles have a particle size of 2.6 mm, stopping the rolling and compression granulator to produce rubber powder-sediment interlocked particles, where the sediment is embedded in the interbonded rubber-powder particles through a compression device;

S7, taking the rubber powder-sediment interlocked particles obtained in the S6 out from the rolling and compression granulator, and sieving the rubber powder-sediment interlocked particles through a square-hole sieve to produce rubber powder-sediment interlocked particles with a particle size of 2.6 mm to 2.9 mm as a second core;

S8, feeding the second core obtained in the S7 and 2.9 parts to 3.6 parts of a hydraulic material into the rolling and compression granulator through the feeding port; re-starting the rolling and compression granulator, adjusting a rotational speed of the rolling and compression granulator to 45 HZ to 50 HZ, and allowing the rolling and compression granulator to rotate for 2 min to 3 min, during which 10 mL to 15 mL of a fluorosilicate-graphene two-component mixed solution is evenly sprayed by a spray can in a particle movement path direction and a particle size is observed every 5 s to 6 s; and when 60% or more of particles have a particle size of 3.2 mm, stopping the rolling and compression granulator to produce rubber powder-sediment-fly ash interbonded particles;

S9, taking out the rubber powder-sediment-fly ash interbonded particles obtained in the S8, and sieving the rubber powder-sediment-fly ash interbonded particles through a square-hole sieve to produce a rubber powder-sediment-fly ash raw material with a particle size of 3.2 mm to 3.6 mm;

S10, curing the rubber powder-sediment-fly ash raw material obtained in the S9 through a multi-stage high-temperature treatment and anaerobic cooling successively; and S11, soaking an aggregate obtained in the S10 in a fluorosilicate-graphene two-component mixed solution for 10 h to 12 h to allow shell solidification, and naturally curing for 4 d to 6 d to produce the rubber powder-sediment-fly ash artificial fine aggregate.

Preferably, in the S3, the S6, and the S8, a spraying speed of the spray can is 0.2 L/min to 0.3 L/min.

Preferably, the rubber powder is a waste tire-based rubber powder with a particle size of 0.1 mm to 0.15 mm.

Preferably, the sediment is a sediment from a main/branch canal in the Hetao Irrigation District, and has a particle size of 0.05 mm to 0.15 mm.

Preferably, in the S8, the hydraulic material is selected from one or more of a fly ash, metakaolin, a lime powder, and a cement; and when the hydraulic material includes a fly ash, a particle size of the fly ash is 0.08 mm to 0.1 mm.

Preferably, in the S3, the S6, the S8, and the S11, a concentration of the fluorosilicate-graphene two-component mixed solution is 1.0 mg/mL to 1.4 mg/mL; a mass ratio of fluorosilicate to graphene in the fluorosilicate-graphene two-component mixed solution is (6-7):1; and the fluorosilicate is selected from one or more of sodium fluorosilicate, lithium fluorosilicate, and potassium fluorosilicate.

Preferably, in the S10, the multi-stage high-temperature treatment and the anaerobic cooling specifically include the following steps:

the multi-stage high-temperature treatment: heating an aggregate at 120° C. to 150° C. for 6 min to 10 min to activate the raw material and accelerate gel formation and dehydration, and cooling at room temperature; 2 min to 3 min later, heating at 210° C. to 250° C. for 4 min to 8 min to allow calcination, and cooling at room temperature; and 2 min to 3 min later, heating at 280° C. to 310° C. for 2 min to 3 min to promote a reaction for enhancing a curing effect; and the anaerobic cooling: subjecting an aggregate produced after the multi-stage high-temperature treatment to air-cooling and carbonization for 18 min to 22 min in a carbon dioxide environment.

Compared with the prior art, the present disclosure has the following beneficial effects:

1. In the present disclosure, a waste rubber powder is treated to improve the hydrophobicity and prolong the service life under the premise of retaining the original excellent properties such as impact resistance, fatigue resistance, wear resistance, and frost resistance of the rubber powder. A treated waste rubber powder can be used for lining of a canal of water conservancy engineering to enhance the erosion resistance and durability.

2. The Hetao Irrigation District is scattered with a large length, involves high sediment collection and transportation costs, and has poor economy. In the present disclosure, in view of the problem that the large freezing deformation caused by sediment accumulation in the Hetao Irrigation District in the winter aggravates the erosion and frost-heaving damage for canal lining and the dilemma that sediments of canals in the Hetao Irrigation District have a low utilization rate and a large environmental impact, sediments of canals are prepared into fine aggregates in a targeted manner. Therefore, the present disclosure can not only solve the environmental problems such as land occupation resulting from accumulation of sediments of canals and sand raising under the wind, but also reduce the sand and gravel mining, the damage to the ecological environment, the cost, and the engineering expenses for canal lining.

3. The fly ash stacking causes a series of environmental problems. The use of a fly ash in the preparation of a concrete can significantly improve the performance of the concrete. Active $SiO_2$ and $Al_2O_3$ in a fly ash can absorb $Ca(OH)_2$ resulting from cement hydration to produce a hydration product with a high strength and prominent stability and improve the generation of a hydrated cementitious substance. A large amount of a C—S—H gel produced during the hydration of a fly ash can absorb and fix large amounts of $Na^+$, $Ka^+$, and chlorides, which can effectively inhibit an alkali aggregate reaction.

4. The use of the layer-by-layer coating technology can ensure that material layers can be evenly and tightly combined together to allow the tight aggregation and the uniform and regular shape, which reduces the stress concentration points and improves the long-term stability of the aggregate.

5. The multi-stage high-temperature curing treatment of a fine aggregate can well control a heating temperature, optimize a curing effect, improve a quality of the aggregate, adapt to different aggregate types, and ensure the performance of a concrete on the basis of improving the performance of the aggregate in an ordinary single high-temperature treatment.

6. Carbon dioxide produced after the combustion of the rubber powder and carbon dioxide introduced in the final air-cooling process can carbonize the outermost material layer to produce a dense calcium carbonate layer, which can improve the permeability resistance while improving the mechanical properties of the aggregate.

DETAILED DESCRIPTION OF THE EMBODIMENTS

The technical solutions of the embodiments of the present disclosure are clearly and completely described below with reference to the accompanying drawings in the embodiments of the present disclosure. Apparently, the embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
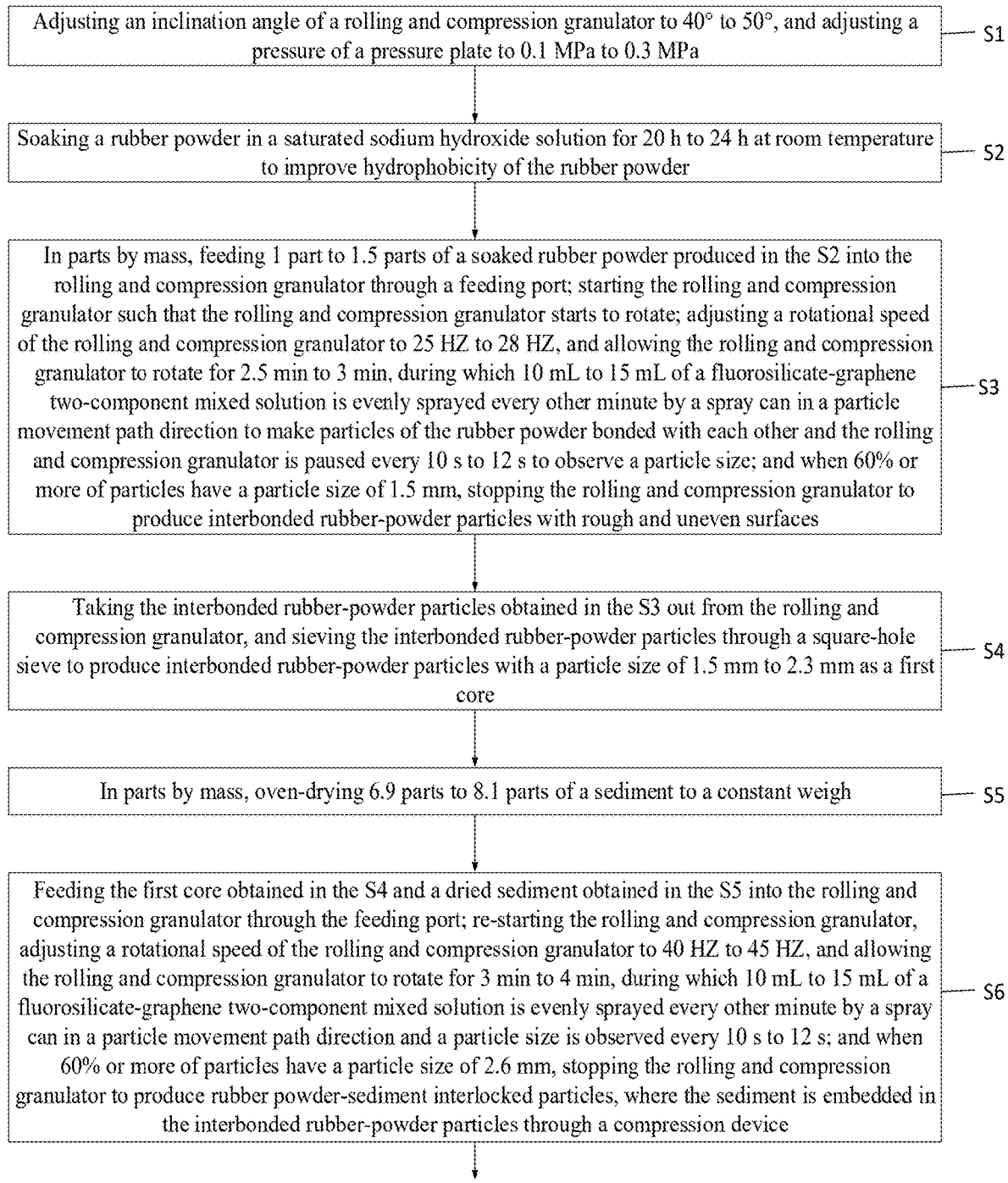
FIGS. 1-2 show a flow chart of the preparation method of a rubber powder-sediment-fly ash artificial fine aggregate in the present disclosure.
Figure 2:
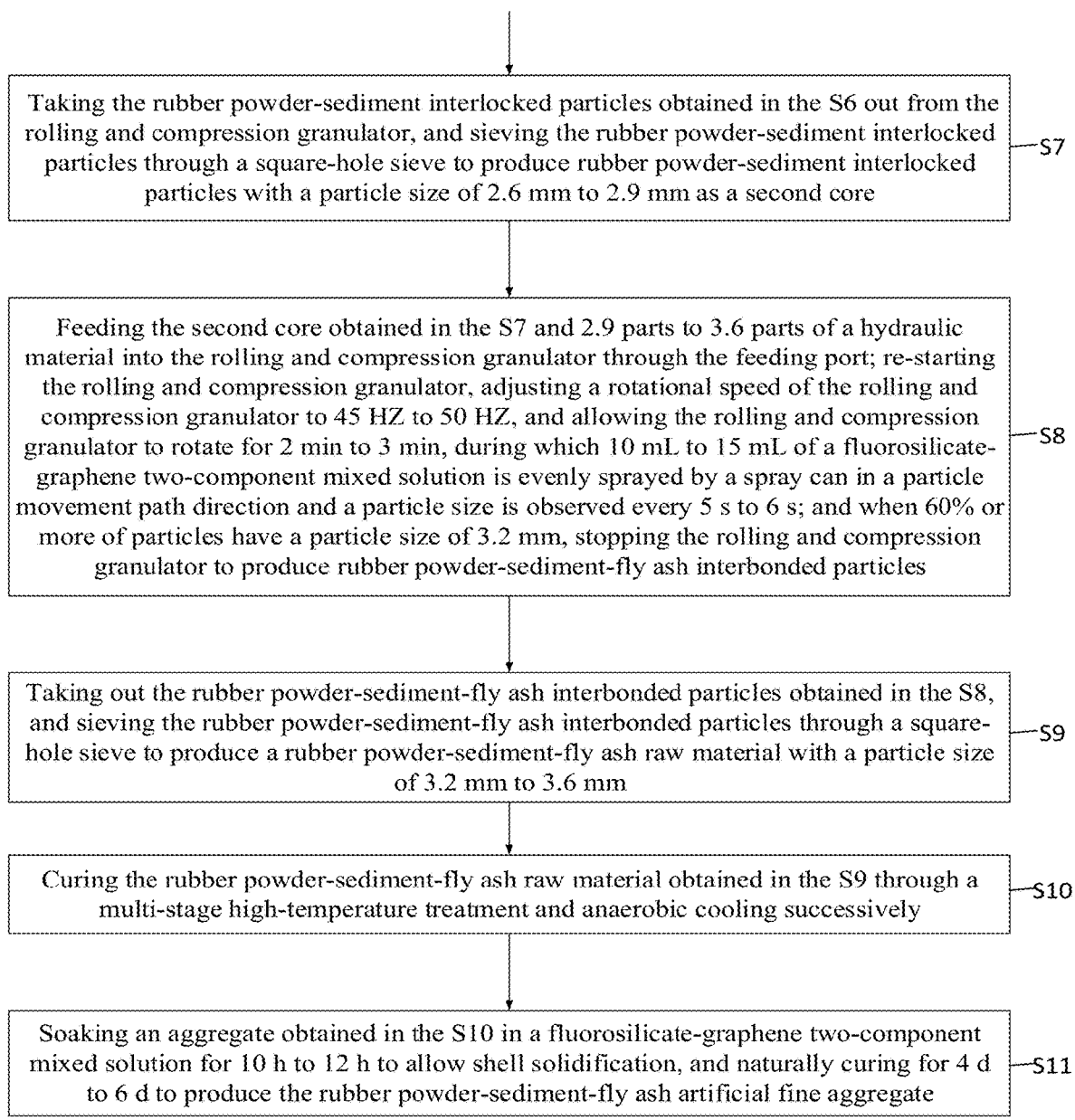

As shown in FIGS. 1-2, the present disclosure provides the following technical solutions:

In the following examples, a chemical composition of the fly ash raw material is shown in Table 1:

TABLE 1

| Chemical composition of the fly ash | | | | | |
|---|---|---|---|---|---|
| Component | $SiO_2$ | $Al_2O_3$ | CaO | $Fe_2O_3$ | Other |
| Content/% | 52 | 34 | 5.9 | 4.6 | 3.5 |

In the following examples, raw materials for preparing rubber powder-sediment-fly ash artificial fine aggregates are shown in Table 2:

TABLE 2

| Raw materials for preparing rubber powder-sediment-fly ash artificial fine aggregates | | | | | |
|---|---|---|---|---|---|
| No. | Group Unit | Rubber powder | Sediment | Fly ash | Lime powder | Fluorosilicate-graphene two-component mixed solution Concentration (mg/mL) |
| | | Mass (g) | | | | |
| 1 | Example 1 | 99 | 696 | 315 | 0 | 1.3 |
| 2 | Example 2 | 100 | 717 | 0 | 353 | 1.3 |
| 3 | Example 3 | 108 | 756 | 232 | 104 | 1.3 |
| 4 | Comparative Example 1 | 99 | 696 | 315 | 0 | 1.3 |
| 5 | Comparative Example 2 | 99 | 696 | 315 | 0 | 1.3 |
| 6 | Comparative Example 3 | 144 | 866 | 0 | 0 | 1.3 |

The fluorosilicate-graphene two-component mixed solution was prepared by mixing a 1.5 mg/mL sodium fluorosilicate solution with a 0.1 mg/mL graphene solution according to a mass ratio of 6:1.

Example 1

A preparation method of a rubber powder-sediment-fly ash artificial fine aggregate was provided, which included the following steps:

S1. An inclination angle of a rolling and compression granulator was adjusted to 42°, and a pressure of a pressure plate was adjusted to 0.15 MPa.

S2. A rubber powder was soaked in a saturated sodium hydroxide solution for 20 h at room temperature to improve the hydrophobicity of the rubber powder.

S3. 99 g of a soaked rubber powder was added to the rolling and compression granulator. The rolling and compression granulator was started, and a rotational speed of the rolling and compression granulator was adjusted to 26 HZ. The rolling and compression granulator was allowed to rotate for 2.8 min, during which 10 mL of a fluorosilicate-graphene two-component mixed solution was evenly sprayed every other minute by a spray can. Then, the rolling and compression granulator was stopped to produce interbonded rubber-powder particles.

S4. The interbonded rubber-powder particles obtained in the S3 were taken out from the rolling and compression granulator and sieved through a square-hole sieve to produce interbonded rubber-powder particles with a particle size of 1.5 mm to 2.3 mm as a first core.

S5. A sediment was oven-dried to a constant weight, and 696 g of a dried sediment was weighed.

S6. 73.2 g of the first core obtained in the S4 and sediment particles obtained in the S5 were added to the rolling and compression granulator. The rolling and compression granulator was re-started, and a rotational speed of the rolling and compression granulator was adjusted to 42 HZ. The rolling and compression granulator was allowed to rotate for 3.6 min, during which 10 mL of a fluorosilicate-graphene two-component mixed solution was evenly sprayed every other minute by a spray can. Then, the rolling and compression granulator was stopped to produce rubber powder-sediment interlocked particles.

S7. The rubber powder-sediment interlocked particles obtained in the S6 were taken out from the rolling and compression granulator and sieved through a square-hole sieve to produce rubber powder-sediment interlocked particles with a particle size of 2.6 mm to 2.9 mm as a second core.

S8. 486.7 g of the second core obtained in the S7 and 315 g of a fly ash were added to the rolling and compression granulator. The rolling and compression granulator was re-started, and a rotational speed of the rolling and compression granulator was adjusted to 48 HZ. The rolling and compression granulator was allowed to rotate for 2.6 min, during which 10 mL of a fluorosilicate-graphene two-component mixed solution was evenly sprayed by a spray can. Then, the rolling and compression granulator was stopped to produce rubber powder-sediment-fly ash interbonded particles.

S9. The rubber powder-sediment-fly ash interbonded particles obtained in the S8 were taken out and sieved through a square-hole sieve to produce a rubber powder-sediment-fly ash raw material with a particle size of 3.2 mm to 3.6 mm.

S10. The rubber powder-sediment-fly ash raw material obtained in the S9 was cured as follows: an aggregate was heated at 120° C. for 6 min, then heated at 210° C. for 4 min after 2 min, then heated at 280° C. for 2 min after 2 min, and then air-cooled for 18 min in an anaerobic environment.

S11. An aggregate obtained in the S10 was soaked in a fluorosilicate-graphene two-component mixed solution for 11 h to allow shell solidification, and then naturally cured for 4 d to produce the rubber powder-sediment-fly ash artificial fine aggregate.

Example 2

A preparation method of a rubber powder-sediment-fly ash artificial fine aggregate was provided, which included the following steps:

S1. An inclination angle of a rolling and compression granulator was adjusted to 41°, and a pressure of a pressure plate was adjusted to 0.15 MPa.

S2. A rubber powder was soaked in a saturated sodium hydroxide solution for 20 h at room temperature to improve the hydrophobicity of the rubber powder.

S3. 100 g of a soaked rubber powder was added to the rolling and compression granulator. The rolling and compression granulator was started, and a rotational speed of the rolling and compression granulator was adjusted to 26 HZ. The rolling and compression granulator was allowed to rotate for 2.7 min, during which 10 mL of a fluorosilicate-graphene two-component mixed solution was evenly sprayed every other minute by a spray can. Then, the rolling and compression granulator was stopped to produce interbonded rubber-powder particles.

S4. The interbonded rubber-powder particles obtained in the S3 were taken out from the rolling and compression granulator and sieved through a square-hole sieve to produce interbonded rubber-powder particles with a particle size of 1.5 mm to 2.3 mm as a first core.

S5. A sediment was oven-dried to a constant weight, and 717 g of a dried sediment was weighed.

S6. 78.6 g of the first core obtained in the S4 and sediment particles obtained in the S5 were added to the rolling and compression granulator. The rolling and compression granulator was re-started, and a rotational speed of the rolling and compression granulator was adjusted to 42 HZ. The rolling and compression granulator was allowed to rotate for 3.5 min, during which 10 mL of a fluorosilicate-graphene two-component mixed solution was evenly sprayed every other minute by a spray can. Then, the rolling and compression granulator was stopped to produce rubber powder-sediment interlocked particles.

S7. The rubber powder-sediment interlocked particles obtained in the S6 were taken out from the rolling and compression granulator and sieved through a square-hole sieve to produce rubber powder-sediment interlocked particles with a particle size of 2.6 mm to 2.9 mm as a second core.

S8. 558.9 g of the second core obtained in the S7 and 353 g of a lime powder were added to the rolling and compression granulator. The rolling and compression granulator was re-started, and a rotational speed of the rolling and compression granulator was adjusted to 48 HZ. The rolling and compression granulator was allowed to rotate for 2.5 min, during which 10 mL of a fluorosilicate-graphene two-component mixed solution was evenly sprayed by a spray can. Then, the rolling and compression granulator was stopped to produce rubber powder-sediment-fly ash interbonded particles.

S9. The rubber powder-sediment-fly ash interbonded particles obtained in the S8 were taken out and sieved through a square-hole sieve to produce a rubber powder-sediment-fly ash raw material with a particle size of 3.2 mm to 3.6 mm.

S10. The rubber powder-sediment-fly ash raw material obtained in the S9 was cured as follows: an aggregate was heated at 120° C. for 6 min, then heated at 210° C. for 4 min after 2 min, then heated at 280° C. for 2 min after 2 min, and then air-cooled for 18 min in an anaerobic environment.

S11. An aggregate obtained in the S10 was soaked in a fluorosilicate-graphene two-component mixed solution for 11 h to allow shell solidification, and then naturally cured for 4 d to produce the rubber powder-sediment-fly ash artificial fine aggregate.

Example 3

A preparation method of a rubber powder-sediment-fly ash artificial fine aggregate was provided, which included the following steps:

S1. An inclination angle of a rolling and compression granulator was adjusted to 41°, and a pressure of a pressure plate was adjusted to 0.15 MPa.

S2. A rubber powder was soaked in a saturated sodium hydroxide solution for 20 h at room temperature to improve the hydrophobicity of the rubber powder.

S3. 108 g of a soaked rubber powder was added to the rolling and compression granulator. The rolling and compression granulator was started, and a rotational speed of the rolling and compression granulator was adjusted to 26 HZ. The rolling and compression granulator was allowed to rotate for 2.5 min, during which 10 mL of a fluorosilicate-graphene two-component mixed solution was evenly sprayed every other minute by a spray can. Then, the rolling and compression granulator was stopped to produce interbonded rubber-powder particles.

S4. The interbonded rubber-powder particles obtained in the S3 were taken out from the rolling and compression granulator and sieved through a square-hole sieve to produce interbonded rubber-powder particles with a particle size of 1.5 mm to 2.3 mm as a first core.

S5. A sediment was oven-dried to a constant weight, and 756 g of a dried sediment was weighed.

S6. 81.3 g of the first core obtained in the S4 and sediment particles obtained in the S5 were added to the rolling and compression granulator. The rolling and compression granulator was re-started, and a rotational speed of the rolling and compression granulator was adjusted to 42 HZ. The rolling and compression granulator was allowed to rotate for 3.6 min, during which 10 mL of a fluorosilicate-graphene two-component mixed solution was evenly sprayed every other minute by a spray can. Then, the rolling and compression granulator was stopped to produce rubber powder-sediment interlocked particles.

S7. The rubber powder-sediment interlocked particles obtained in the S6 were taken out from the rolling and compression granulator and sieved through a square-hole sieve to produce rubber powder-sediment interlocked particles with a particle size of 2.6 mm to 2.9 mm as a second core.

S8. 636.6 g of the second core obtained in the S7, 232 g of a fly ash, and 104 g of a lime powder were added to the rolling and compression granulator. The rolling and compression granulator was re-started, and a rotational speed of the rolling and compression granulator was adjusted to 48 HZ. The rolling and compression granulator was allowed to rotate for 2.5 min, during which 10 mL of a fluorosilicate-graphene two-component mixed solution was evenly sprayed by a spray can. Then, the rolling and compression granulator was stopped to produce rubber powder-sediment-fly ash interbonded particles.

S9. The rubber powder-sediment-fly ash interbonded particles obtained in the S8 were taken out and sieved through a square-hole sieve to produce a rubber powder-sediment-fly ash raw material with a particle size of 3.2 mm to 3.6 mm.

S10. The rubber powder-sediment-fly ash raw material obtained in the S9 was cured as follows: an aggregate was heated at 120° C. for 6 min, then heated at 210° C. for 4 min after 2 min, then heated at 280° C. for 2 min after 2 min, and then air-cooled for 18 min in an anaerobic environment.

S11. An aggregate obtained in the S10 was soaked in a fluorosilicate-graphene two-component mixed solution for 11 h to allow shell solidification, and then naturally cured for 4 d to produce the rubber powder-sediment-fly ash artificial fine aggregate.

COMPARATIVE EXAMPLES

Comparative Example 1: Comparative Example 1 was Different from Example 1 Merely in that: In Comparative Example 1, the S3, S4, S6, S7, and S8 in Example 1 were omitted, that is, the layer-by-layer coating-based preparation method in Example 1 was canceled. In Comparative Example 1, the raw materials were simply mixed according to the ratio and then added to the granulator, a rotational speed of the granulator was adjusted to 38 HZ, and the granulator was allowed to rotate for 9 min.

Comparative Example 2: Comparative Example 2 was different from Example 1 merely in that: In Comparative Example 2, the S10 in Example 1 was omitted. That is, in Comparative Example 2, the multi-stage high-temperature treatment was not adopted for curing the rubber powder-sediment-fly ash raw material. In Comparative Example 2, the rubber powder-sediment-fly ash raw material was simply heated at 210° C. for 12 min and then subjected to anaerobic cooling.

Comparative Example 3: Comparative Example 3 was different from Example 1 merely in that: In Comparative Example 3, the S8 and S9 in Example 1 were omitted. In Comparative Example 3, 144 g of the rubber powder and 866 g of the sediment were added to the granulator to prepare rubber powder-sediment interlocked particles, and the rubber powder-sediment interlocked particles were directly cured.

Properties of the rubber powder-sediment-fly ash artificial fine aggregates prepared in Examples 1 to 3 and Comparative Examples 1 to 3 were tested. Test results were shown in Table 3:

TABLE 3

Properties of the rubber powder-sediment-fly ash artificial fine aggregates absorption

| No. | Group | Fineness modulus | Water absorption rate (%) | Single-time maximum crush index (%) |
|---|---|---|---|---|
| 1 | Example 1 | 2.9-3.2 | 28.3 | 20.8 |
| 2 | Example 2 | 2.85-3.3 | 27.6 | 20.3 |
| 3 | Example 3 | 2.64-3.0 | 28.9 | 21.2 |
| 4 | Comparative Example 1 | 2.9-3.2 | 29.8 | 22.1 |
| 5 | Comparative Example 2 | 2.9-3.1 | 29.6 | 22.8 |
| 6 | Comparative Example 3 | 3.0-3.2 | 29.5 | 23.4 |

Further, the rubber powder-sediment-fly ash artificial fine aggregates prepared in Examples 1 to 3 of the present disclosure have a fineness modulus of basically 2.9 to 3.2 and a single-time maximum crush index of less than or equal to 25%, which basically meet the quality standards for fine aggregates in "JG T 568-2019". It can be seen that a rubber powder-sediment-fly ash artificial fine aggregate is prepared by a rolling and compression granulator through layer-by-layer coating of a rubber powder, a canal sediment, and a hydraulic material in the present disclosure, and the rubber powder-sediment-fly ash artificial fine aggregate can be used instead of sand and gravel fine aggregates. Therefore, the present disclosure can effectively alleviate the current shortage of sand and gravel resources.

With reference to the above content, Comparative Examples 1 to 3 all have significantly inferior indexes such as a fineness modulus, a water absorption rate, and a single-time maximum crush index to Example 1. It indicates that the present disclosure allows the tight arrangement and aggregation of the artificial aggregate, optimizes a curing effect for the artificial aggregate, and improves the long-term stability and quality of the aggregate through steps such as hydraulic material addition, layer-by-layer coating, and multi-stage high-temperature treatment.

Although the examples of the present disclosure have been illustrated and described, it should be understood that those of ordinary skill in the art may make various changes, modifications, replacements, and variations to the above examples without departing from the principle and spirit of the present disclosure, and the scope of the present disclosure is limited by the appended claims and legal equivalents thereof.

What is claimed is:
1. A preparation method of a rubber powder-sediment-fly ash artificial fine aggregate, comprising the following steps:

S1, adjusting an inclination angle of a rolling and compression granulator to 40° to 50°, and adjusting a pressure of a pressure plate to 0.1 MPa to 0.3 MPa;

S2, soaking a rubber powder in a saturated sodium hydroxide solution for 20 h to 24 h at room temperature to improve hydrophobicity of the rubber powder;

S3, in parts by mass, feeding 1 part to 1.5 parts of a soaked rubber powder produced in the S2 into the rolling and compression granulator through a feeding port; starting the rolling and compression granulator such that the rolling and compression granulator starts to rotate; adjusting a rotational speed of the rolling and compression granulator to 25 HZ to 28 HZ, and allowing the rolling and compression granulator to rotate for 2.5 min to 3 min, during which 10 mL to 15 mL of a fluorosilicate-graphene two-component mixed solution is evenly sprayed every other minute by a spray can in a particle movement path direction to make particles of the soaked rubber powder bonded with each other and the rolling and compression granulator is paused every 10 s to 12 s to observe a first particle size; and when 60% or more of first particles have a particle size of 1.5 mm, stopping the rolling and compression granulator to produce interbonded rubber-powder particles with rough and uneven surfaces;

S4, taking the interbonded rubber-powder particles obtained in the S3 out from the rolling and compression granulator, and sieving the interbonded rubber-powder particles through a first square-hole sieve to produce interbonded rubber-powder particles with a particle size of 1.5 mm to 2.3 mm as a first core;

S5, in parts by mass, oven-drying 6.9 parts to 8.1 parts of a sediment to a constant weight;

S6, feeding the first core obtained in the S4 and a dried sediment obtained in the S5 into the rolling and compression granulator through the feeding port; re-starting the rolling and compression granulator, adjusting the rotational speed of the rolling and compression granulator to 40 HZ to 45 HZ, and allowing the rolling and compression granulator to rotate for 3 min to 4 min, during which 10 mL to 15 mL of the fluorosilicate-graphene two-component mixed solution is evenly sprayed every other minute by the spray can in the particle movement path direction and a second particle size is observed every 10 s to 12 s; and when 60% or more of second particles have a particle size of 2.6 mm, stopping the rolling and compression granulator to produce rubber powder-sediment interlocked particles, wherein the sediment is embedded in the first core through a compression device;

S7, taking the rubber powder-sediment interlocked particles obtained in the S6 out from the rolling and compression granulator, and sieving the rubber powder-sediment interlocked particles through a second square-hole sieve to produce rubber powder-sediment interlocked particles with a particle size of 2.6 mm to 2.9 mm as a second core;

S8, feeding the second core obtained in the S7 and 2.9 parts to 3.6 parts of a hydraulic material and fly ash into the rolling and compression granulator through the feeding port; re-starting the rolling and compression granulator, adjusting the rotational speed of the rolling and compression granulator to 45 HZ to 50 HZ, and allowing the rolling and compression granulator to rotate for 2 min to 3 min, during which 10 mL to 15 mL of the fluorosilicate-graphene two-component mixed solution is evenly sprayed by the spray can in the particle movement path direction and a third particle size is observed every 5 s to 6 s; and when 60% or more of third particles have a particle size of 3.2 mm, stopping the rolling and compression granulator to produce rubber powder-sediment-fly ash interbonded particles;

S9, taking out the rubber powder-sediment-fly ash interbonded particles obtained in the S8, and sieving the rubber powder-sediment-fly ash interbonded particles through a third square-hole sieve to produce a rubber powder-sediment-fly ash raw material with a particle size of 3.2 mm to 3.6 mm;

S10, curing the rubber powder-sediment-fly ash raw material obtained in the S9 through a multi-stage high-temperature treatment and anaerobic cooling successively; and S11, soaking an aggregate obtained in the S10 in the fluorosilicate-graphene two-component mixed solution for 10 h to 12 h to allow shell solidification, and naturally curing for 4 d to 6 d to produce the rubber powder-sediment-fly ash artificial fine aggregate.

2. The preparation method of the rubber powder-sediment-fly ash artificial fine aggregate according to claim 1, wherein in the S3, the S6, and the S8, a spraying speed of the spray can is 0.2 L/min to 0.3 L/min.

3. The preparation method of the rubber powder-sediment-fly ash artificial fine aggregate according to claim 1, wherein the rubber powder is a waste tire-based rubber powder with a particle size of 0.1 mm to 0.15 mm.

4. The preparation method of the rubber powder-sediment-fly ash artificial fine aggregate according to claim 1, wherein the sediment is a sediment from a main/branch canal in the Hetao Irrigation District, and has a particle size of 0.05 mm to 0.15 mm.

5. The preparation method of the rubber powder-sediment-fly ash artificial fine aggregate according to claim 1, wherein in the S8, the hydraulic material is selected from one or more of a fly ash, metakaolin, a lime powder, and a cement; and when the hydraulic material comprises the fly ash, a particle size of the fly ash is 0.08 mm to 0.1 mm.

6. The preparation method of the rubber powder-sediment-fly ash artificial fine aggregate according to claim 1, wherein in the S3, the S6, the S8, and the S11, a concentration of the fluorosilicate-graphene two-component mixed solution is 1.0 mg/mL to 1.4 mg/mL; a mass ratio of fluorosilicate to graphene in the fluorosilicate-graphene two-component mixed solution is (6-7):1; and the fluorosilicate is selected from one or more of sodium fluorosilicate, lithium fluorosilicate, and potassium fluorosilicate.

7. The preparation method of the rubber powder-sediment-fly ash artificial fine aggregate according to claim 1, wherein in the S10, the multi-stage high-temperature treatment and the anaerobic cooling comprise the following steps:

the multi-stage high-temperature treatment: heating an aggregate at 120° C. to 150° C. for 6 min to 10 min to activate the rubber powder-sediment-fly ash raw material and accelerate gel formation and dehydration, and cooling at room temperature; 2 min to 3 min later, heating at 210° C. to 250° C. for 4 min to 8 min to allow calcination, and cooling at room temperature; and 2 min to 3 min later, heating at 280° C. to 310° C. for 2 min to 3 min to promote a reaction for enhancing a curing effect; and the anaerobic cooling: subjecting an aggregate produced after the multi-stage high-temperature treatment to air-cooling and carbonization for 18 min to 22 min in a carbon dioxide environment.

\* \* \* \* \*